(12) United States Patent
Pollman

(10) Patent No.: US 6,966,859 B2
(45) Date of Patent: Nov. 22, 2005

(54) HYDROMECHANICAL TRANSMISSION WITH DIFFERENTIAL STEER

(75) Inventor: Frederic W. Pollman, Eden Prairie, MN (US)

(73) Assignee: Sauer-Danfoss, Inc., Ames, IA (US)

( * ) Notice: Subject to any disclaimer, the term of this patent is extended or adjusted under 35 U.S.C. 154(b) by 0 days.

(21) Appl. No.: 10/873,906

(22) Filed: Jun. 22, 2004

(65) Prior Publication Data

US 2004/0231896 A1    Nov. 25, 2004

Related U.S. Application Data

(62) Division of application No. 10/302,659, filed on Nov. 22, 2002.

(51) Int. Cl.[7] ............................................... F16H 3/72
(52) U.S. Cl. ........................................................ 475/6
(58) Field of Search ............................ 475/27, 74, 72, 475/6, 10, 341, 342, 24

(56) References Cited

U.S. PATENT DOCUMENTS

| | | |
|---|---|---|
| 3,530,741 A | 9/1970 | Charest |
| 3,751,903 A | 8/1973 | Bauchet et al. |
| 3,815,698 A | 6/1974 | Reed |
| 4,132,278 A | 1/1979 | Todeschini |
| 4,345,488 A | 8/1982 | Reed |
| 4,393,952 A | 7/1983 | Schreiner |
| 4,462,210 A | 7/1984 | Pollman et al. |
| 4,471,669 A | 9/1984 | Seaberg |
| 4,485,691 A | 12/1984 | Reed |
| 4,682,515 A | 7/1987 | Reed |
| 4,729,257 A | 3/1988 | Nelson |
| 4,799,401 A | 1/1989 | Reed |
| 4,962,825 A | 10/1990 | Albright et al. |
| 4,997,412 A | 3/1991 | Reed |
| 5,076,377 A | 12/1991 | Frazer |
| 5,139,465 A | 8/1992 | Sato |
| 5,195,600 A | 3/1993 | Dorgan |
| 5,529,136 A | 6/1996 | Zulu |
| 5,545,098 A | 8/1996 | Zulu |
| 5,910,060 A | 6/1999 | Blume |
| 5,989,142 A | 11/1999 | Satzler |
| 6,039,133 A | 3/2000 | Zulu |
| 6,090,005 A | 7/2000 | Schmidt et al. |
| 6,125,954 A | 10/2000 | Oota et al. |
| 6,126,564 A | 10/2000 | Irikura et al. |
| 6,312,354 B1 | 11/2001 | Irikura et al. |
| 6,338,689 B1 | 1/2002 | Pollman |
| 6,397,966 B1 | 6/2002 | Irikura et al. |
| 6,852,053 B2 * | 2/2005 | Nakano et al. ................. 475/5 |

* cited by examiner

Primary Examiner—Dirk Wright

(57) ABSTRACT

A transmission has an HMT which is in parallel with an HST both driving two planetaries which are used for forward/reverse and for differential steer. A two or three mode HMT is created by having a first HST in parallel with two or three mechanical power paths defined by separate clutches. One clutch has a speed reversing gear to produce reverse output speed. A four-element planetary sums the parallel flow and delivers variable speed and torque to two output shafts. The differential steer is created by two planetaries connected with the outputs of the HMT and a second HST. The planetaries have a speed reversing gear on one power path connection. The second HST controls the differential speed between the output shafts by adding speed to one and subtracting speed from the other.

6 Claims, 5 Drawing Sheets

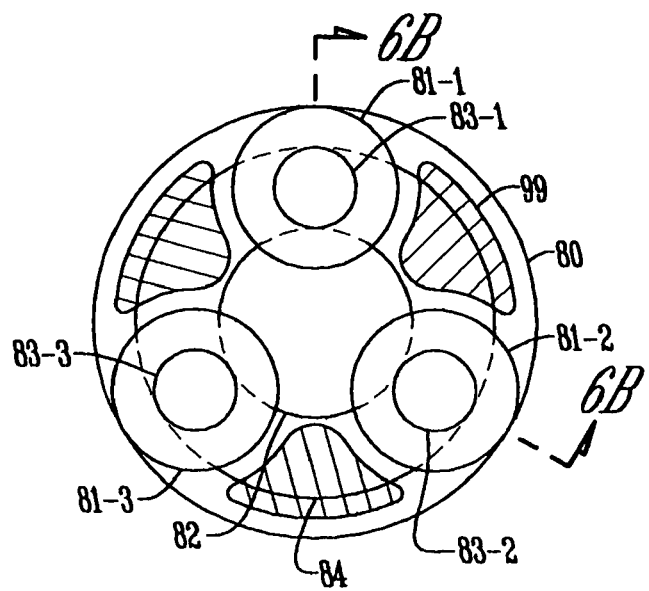
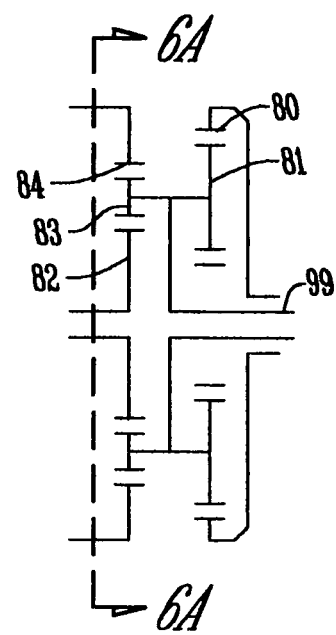
Fig. 6A     Fig. 6B
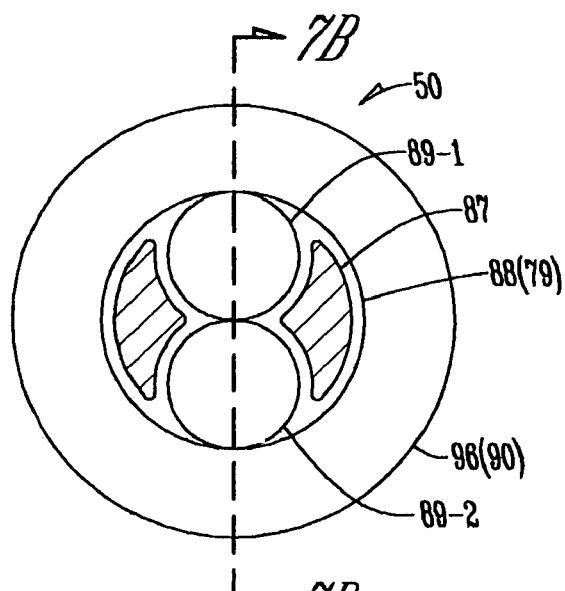
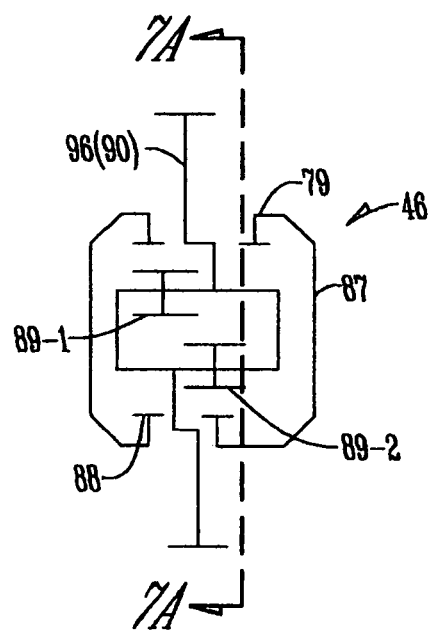
Fig. 7A     Fig. 7B

HYDROMECHANICAL TRANSMISSION WITH DIFFERENTIAL STEER

This application is a division of application Ser. No. 10/302,659 filed Nov. 22, 2002.

BACKGROUND OF THE INVENTION

There are a number of skid steer vehicles that need to have transmissions which have the capability to provide a separate controlled speed output to each side of the vehicle in order to steer it. These include skid steer loaders, crawler tractors and loaders, tracked farm tractors, asphalt pavers and utility machines. These vehicles may have wheels or tracks, and if wheeled may have either a fixed or variable wheel geometry. Many of these vehicles have a hydrostatic transmission for each side of the vehicle with a separate speed control for each transmission in order to steer, typically referred to as a dual path transmission. These dual path transmissions must be coordinated in order to achieve both steering and forward or reverse motion control.

In order to increase the utility of these vehicles, output speeds in the forward direction of travel are increasing. As wheeled vehicles such as skid steer loaders have a short wheelbase, the need for precise control of the steer function increases as speed increases. Dual path transmissions may not provide the necessary control for these higher speed vehicles.

High efficiency of operation is also becoming more important in order to reduce operating cost. Compact size is important for ease of installation.

It is therefore a principal object of this invention to provide a hydromechanical transmission with differential steer which accommodates the need for increasing vehicle speeds with good steer control, particularly in wheeled vehicles such as skid steer loaders.

A further object of the invention is to provide a hydromechanical transmission with differential steer which satisfies the needs for high efficiency, compact size and low cost.

These and other objects will be apparent to those skilled in the art.

SUMMARY OF THE INVENTION

A transmission has an HMT which is in parallel with an HST, both driving two planetaries which are used for forward/reverse and for differential steer. A two or three mode HMT is created by having a first HST in parallel with two or three mechanical power paths defined by separate clutches. One clutch has a speed reversing gear to produce reverse output speed. A four-element planetary sums the parallel flow and delivers variable speed and torque to two output shafts. The differential steer is created by two planetaries connected with the outputs of the HMT and a second HST. The planetaries have a speed reversing gear on one power path connection. The second HST controls the differential speed between the output shafts by adding speed to one and subtracting speed from the other.

BRIEF DESCRIPTION OF THE DRAWINGS

FIGS. 6A and 6B are schematic drawings of a planetary gear in elevation and in section, respectively;

FIGS. 7A and 7B are views similar to those of FIGS. 6A and 6B for a different planetary;

DESCRIPTION OF THE EMBODIMENTS OF THE INVENTION

Figure 1:
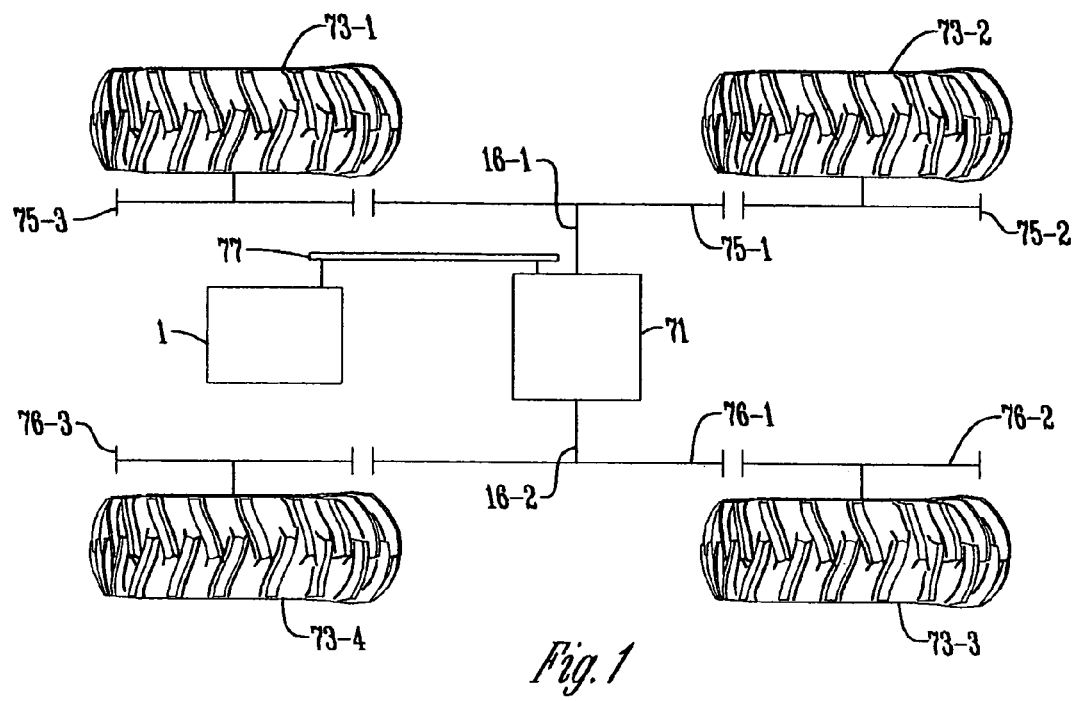
FIG. 1 is a schematic plan view of a skid loader with a transverse engine.

The vehicles intended for application of this transmission are work vehicles with high maneuverability including counter-rotation and spin turns. Many have a requirement for continuous forward to reverse cycling. It is desirable to have a continuous ratio throughout the vehicle speed range in order to allow maximum flexibility for the driver or the work to be done. The transmission output drives are typically located adjacent to the wheels or tracks and are close coupled to the wheel or track drive. This might be gears or chains depending on the vehicle needs. The engine may be positioned longitudinally with respect to the vehicle direction of travel, or transversely in order to accommodate space or weight distribution needs. The maximum output speed may vary according to the vehicle vocation. The maximum torque requirement in reverse may be lower than in forward.

Hydromechanical transmissions are characterized by a hydrostatic transmission power path in parallel with a mechanical power transmission path, arranged in a manner to decrease the average power flow through the hydrostatic portion to thereby increase operating efficiency. Typically, the mechanical power path includes a planetary gear set which acts to sum the power flows at either the input or output end of the transmission.

The existence of parallel power paths creates the possibility of reducing the output speed range or torque ratio in order to further reduce transmitted hydrostatic power. This then requires multiple ranges or "modes" to achieve the full torque and speed range of the transmission. The impact of multiple modes is to improve efficiency and sometimes to reduce cost. In addition to efficiency and cost, the magnitude of the output speed range/torque ratio in each mode has an impact on input power capacity relative to the size of the HST. Smaller ratios allow larger input power for the same size hydrostatic units. It is obvious that more modes allow either smaller mode ratios or larger transmission ratios or both. These relationships create the possibility for having a versatile design configuration that accommodates a number of market needs for input power, ratio range and efficiency.

Multi-mode HMT's are usually accomplished by reusing the hydrostatic components and clutching to a different mechanical component. The mechanical component will be a planetary if the mode is hydromechanical. Usually the modes are arranged so that there is no ratio change during the mode change in order to have continuous speed or torque delivery. Also, the hydrostatic transmission is usually stroked over center from full positive displacement to full negative displacement in order to fully utilize the installed hydrostatic power.

Differential steer transmissions have two inputs and two outputs. One input is for vehicle average speed and one is for steering, and each output powers a side of the vehicle. The differential steering input regulates the relative speed of each side of the vehicle, usually by subtracting speed from one side and adding it to the other. Differential steer speed is usually powered by a hydrostatic transmission. The forward/reverse speed input may be powered by any transmission form.

With reference to FIG. 1, the engine 1 crankshaft is positioned transversely to the direction of vehicle motion. For compact vehicles, the transmission 71 is mounted parallel to the engine and is driven by a belt 77. For vehicles with allowable space, the transmission may be mounted directly to the engine. The transmission output shafts 16-1 and 16-2, which are separately operator controlled, are connected to a drive train and to the wheels. In the case illustrated, shaft 16-1 drives gear set 75-1/75-2/75-3, which in turn drive wheels 73-1 and 73-2 at the same speed. Shaft 16-2 drives gear set 76-1/76-2/76-3 and wheels 73-3 and 73-4 at the same speed. Some vehicles might use a chain set or a different gear arrangement to drive the wheels.

Figure 2:
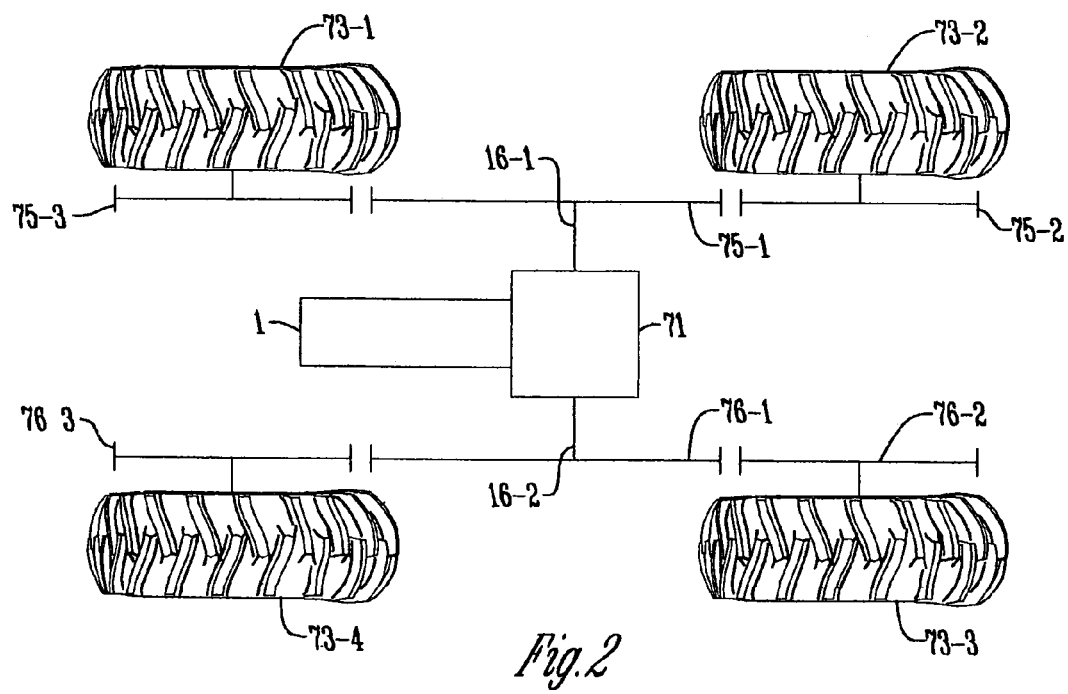
FIG. 2 is a schematic plan view of a skid loader with a longitudinally disposed engine.

With reference to FIG. 2, the engine 1 crankshaft is positioned parallel to the direction of vehicle motion. The transmission 71, which has an internal right angle drive, is mounted directly to the engine. The transmission outputs are connected to the wheels as in the transverse example above.

Figure 3A:
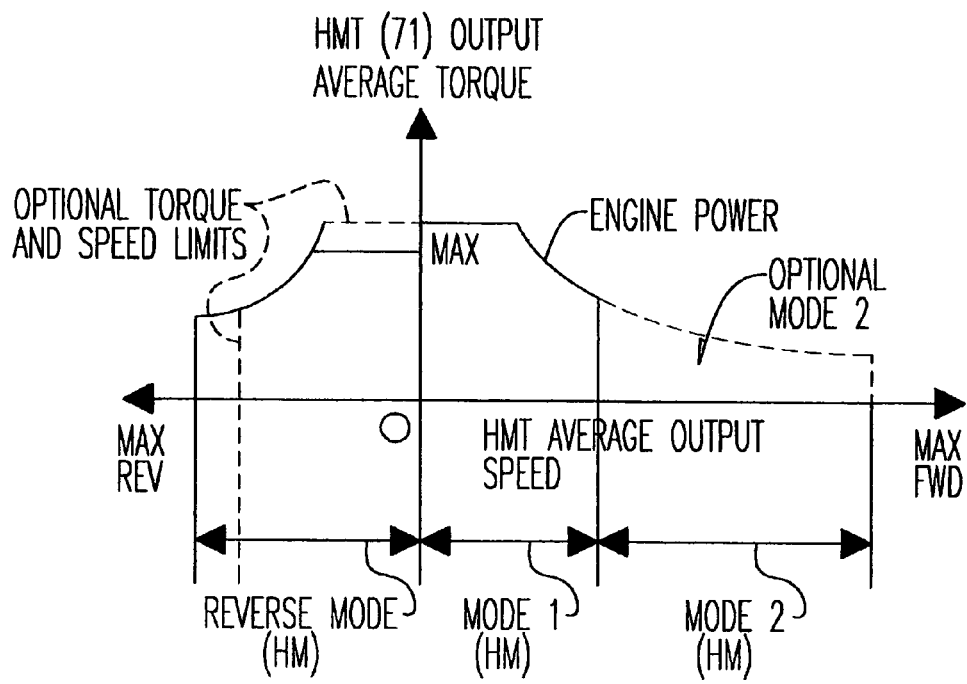
FIGS. 3A and 3B are graphs showing transmission average output speed vs output torque, respectively, vs. HST F-unit speed for a 2 mode and 3 mode HMT.
Figure 3B:
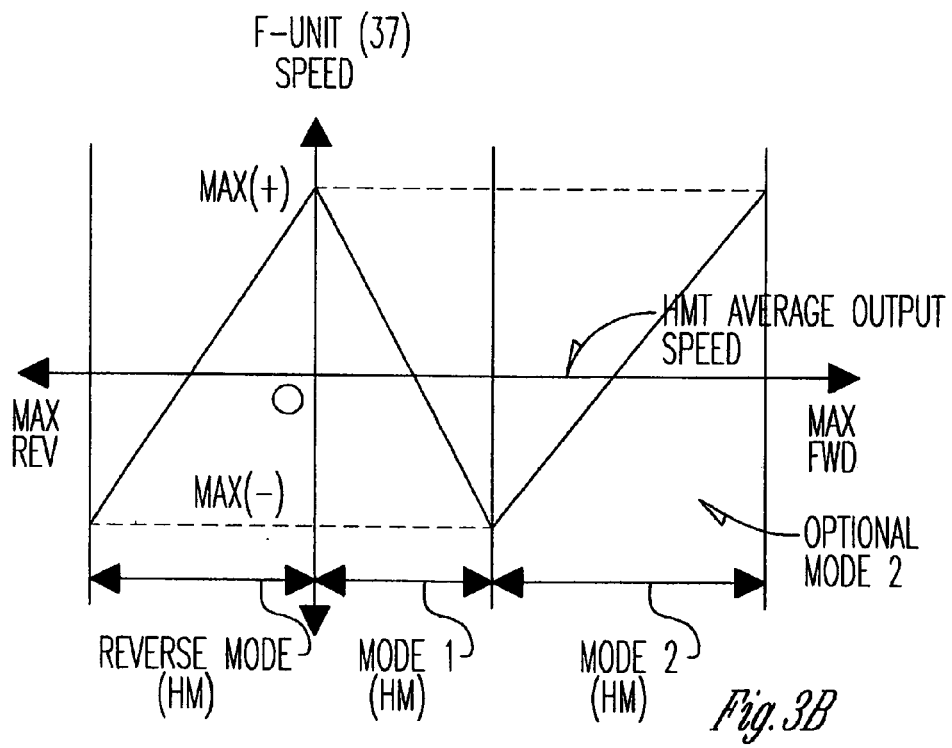

Transmission average output speed and torque are shown in FIG. 3A, and output speed vs. HST F-unit speed in FIG. 3B. Both 2-mode and 3-mode HMT's are shown. The number of modes and the exact scale of the torque and speed would be a result of the vehicle needs. All modes are hydromechanical and have a split power flow. The speed for both mode 1 forward and reverse mode start at zero speed and are continuously increasing in speed until the limit of the hydrostatic units is reached. This allows continuous cycling forward to reverse while maintaining continuous speed and torque control. As mode 1 forward and reverse mode are separate hydromechanical modes, maximum torque in reverse need not be the same as maximum torque in forward. If a higher forward speed is required, mode 2 is added at the end of mode 1 and it is also continuous in ratio. The F-unit 37 (FIG. 3B) of the hydrostatic transmission is continuous in speed between modes and reaches full design speed at the beginning and end of each mode.

Figure 4:
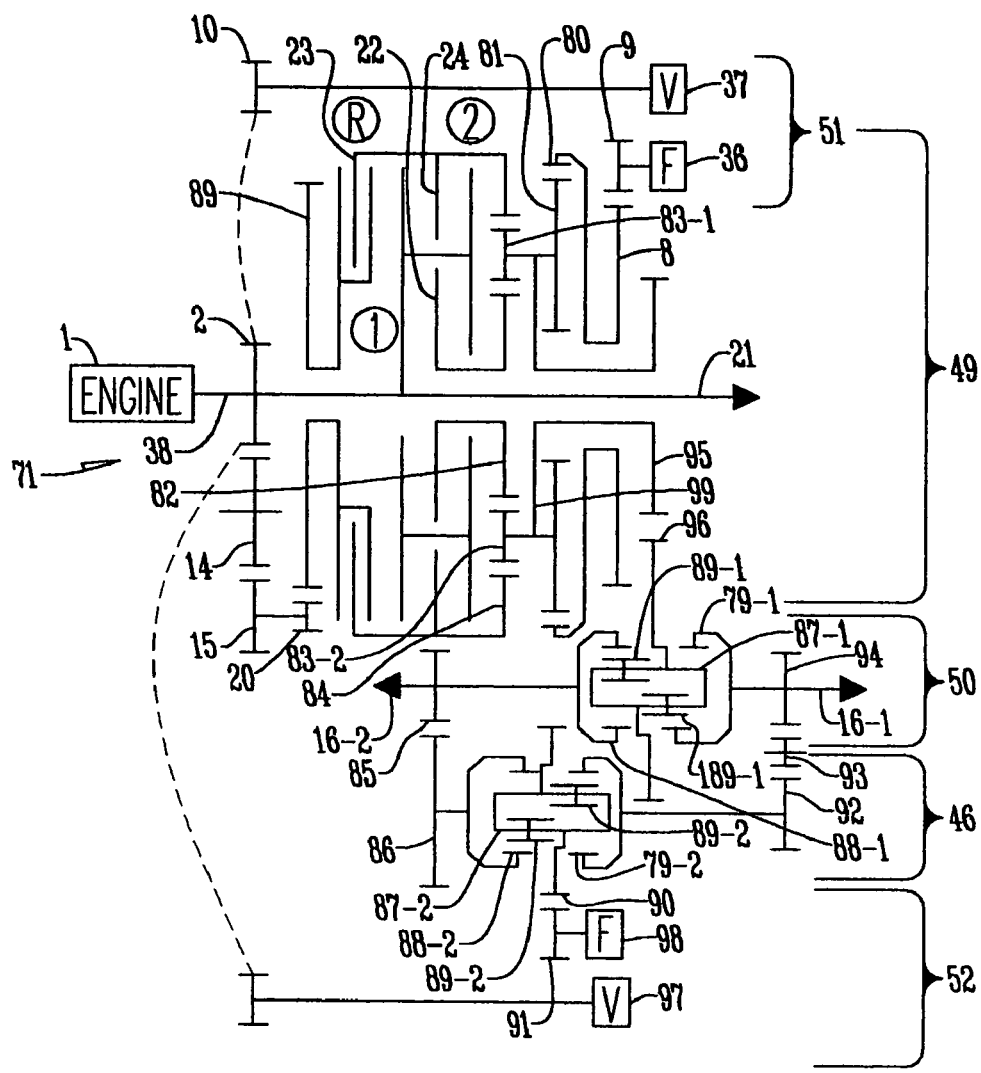
FIG. 4 is a schematic drawing of HMT circuitry and components having coaxial clutches and series steer planataries.

FIG. 4 shows a schematic drawing for transmission circuitry and components having a four element HMT planetary and coaxial clutches, and series steer planetaries.

For the HMT portion, primary component groups are the hydrostatic transmission 51, 4-element planetary summer 49 which consists of ring 80, ring 84, sun 82 and carrier 99, and three clutches 22, 23 and 24. Differential steer planetaries 46 and 50 are active when steering. In the start-up mode, which is hydromechanical, clutch 22 is engaged for mode 1 forward that enables engine power to flow to sun 82. Engine 1 is connected through shaft 38 to gear set 2/10 to the hydrostatic transmission 51. However as both V-unit 37 and F-unit 36 are at maximum displacement and the same speed, no power is being transmitted. As the operator and programmed logic commands, a controller strokes V-unit 37 displacement to a smaller value. Note that power is now being delivered to planetary 49 through gear set 8/9 to ring 80, and through shaft 38 to sun 82, creating parallel power paths. Power is transmitted from both paths to planets 81/83-1, 81/83-2 and 81/83-3 to carrier 99, to gear set 95/96 and to outputs 16-1, 16-2. Because ring 80 is speed controlled by HST 51, a variable speed is controlled at outputs 16-1, 16-2. As V-unit 37 is stroked toward zero displacement, F-unit 36 slows and rotation of gear set 9/8 also slows, which speeds up carrier 99 and outputs 16-1, 16-2. As V-unit 37 is stroked through zero and then to maximum in the negative direction, carrier 99 continues to speed up and the output shafts 16-1 and 16-2 reach the maximum forward speed for mode 1. The stroke control logic for the V-unit that resides in a controller may be of any type and may be like that described in U.S. Pat. No. 5,560,203.

For reverse direction of travel, clutch 23 is engaged. This is done at zero output speed with ring 84 and gear 89 at the same nominal speed, which is negative with respect to engine rotation. At this condition, V-unit 37 is fully stroked in a positive direction. Gear set 2/14/15/20/89 is driven by the input shaft 38, enabling power flow in planetary 49 through ring 84, and in ring 80 through HST 51, creating a parallel power path. As clutch 22 is disengaged, sun 82 turns free preventing power flow. The controller strokes V-unit 37 from full positive to full negative displacement, first reducing the speed of F-unit 36 to zero and then increasing it to full negative speed, which causes carrier 99 and outputs 16-1, 16-2 to increase in speed with reverse rotation. With a variable speed from F-unit 36 to regulate ring 80 speed, and a fixed speed from input 38 to determine ring 84 speed, output speed is controlled between zero and its maximum value in reverse by V-unit 37. The stroke control logic for V-unit 37 is consistent with mode 1 forward.

If a second forward mode is required, a mode change is initiated and clutch 22 and 24 are shifted. At the fully negative stroked position of V-unit 37, ring 84 and ring 82 of planetary 49 are at the same nominal speed. When clutch 24 is engaged, power from input shaft 38 is delivered to ring 84, and power is delivered to ring 80 through HST 51. Sun 82 turns free. The controller strokes V-unit 37 from full negative to full positive displacement and output speed delivered through carrier 99 and gear set 95/96 to shafts 16-1 and 16-2 and output speed reaches maximum for mode 2 forward. The stroke control logic for V-unit 37 is consistent with mode 1 forward and reverse mode.

Note that continuous power is delivered from the engine to the wheels, with continuous ratio change, from full reverse to full forward speed even though the transmission changes modes at zero speed and at about half forward speed. The gear ratios may be different to accommodate different torque/speed ratio spreads for the HMT.

Also, note that planetary 49 has four rotatable power elements but only one set of planet axes. This is accomplished by having a normal three element planetary with compound planets and engaging an extra element with the planet gears. See FIGS. 6A and 6B for more detail. Ring 80, planets 81/83, sun 82 and carrier 99 form a compound planetary with three elements and a ratio of negative 1:1 between ring 80 and sun 82. A negative ratio is defined as having one element rotate opposite the other when the carrier is fixed. Adding ring 84 forms a fourth element with ring 84/sun 82 ratio different than 80/82 and also in a negative direction.

The differential steer portion is done with HST 52 and planetaries 50 and 46. Planetaries 50 and 46 are similar and have a negative 1:1 ratio between the rings 79 and 88. The rings 79-1 and 79-2 are connected with the same ratio as 88-1 and 88-2 except that one is positive and the other is negative. When speed is applied to carrier 87-1 by HMT output 95/96, planetary 50 applies equal torque to rings 79-1 and 88-1. The speed of output shaft 16-1 and 16-2 is determined by the action of planetary 46. For straight-ahead motion, F-unit 98 is at zero speed which locks gear set 91/90 and carrier 87-2. With carrier 87-2 locked, rings 79-2 and 88-2 are constrained to operate in the opposite direction but at the same speed. As these rings are also connected with output shafts 16-1 and 16-2 with the same ratio but opposite rotation, both shafts 16 are constrained to operate at the same speed and in the same direction, producing straight-line motion for the vehicle. When V-unit 97 is stroked in one direction, F-unit 98 turns gear set 91/90 and rotates carrier 87-2. This requires rings 79-2 and 88-2 to change speed in an amount and direction equal to the change in carrier speed. This then has the effect of adding speed to one of shafts 16-1 or 16-2 and subtracting an equal amount from the other, producing steering of the vehicle. Reversing the direction of HST 52 will reverse the direction of the differential speed at the output shafts. Note that the effect of this planetary arrangement is for the HMT input to control average output speed and the HST input to control differential output speed.

Planetaries 50 and 46 have two rings 79 and 88, two planets 89 and no sun gear. The planets act as reversing idler gears except that they are mounted on a rotatable member. See FIGS. 7A and 7B for a more detailed drawing of planetaries 50 and 46. Ring 79 and 88 are the same size and are mounted on the same centerline. Each ring meshes with one of the planets separately. The two planets 89-1 and 89-2, which mesh together, are mounted on carrier 87, which also rotates on ring 79/88 centerline. If the carrier rotation is fixed, ring 79 rotates at the same speed but opposite rotation of ring 88 (a negative 1:1 ratio).

Figure 5:
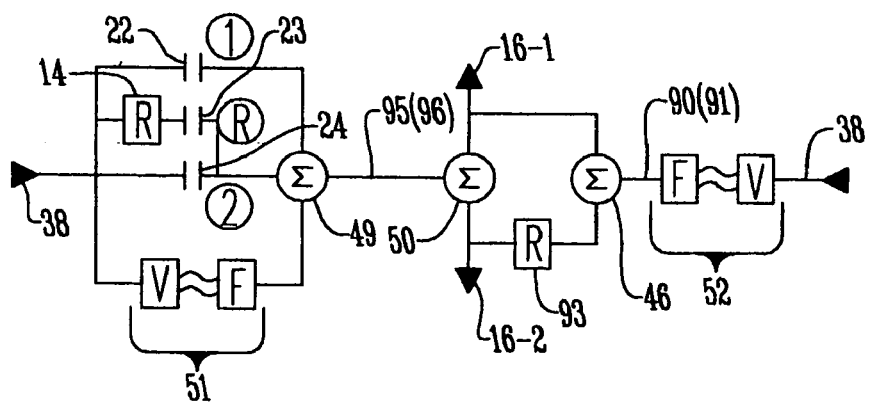
FIG. 5 is a block diagram for the transmission of FIG. 4.

FIG. 5 shows a block diagram for the transmission of FIG. 4 having a four element HMT planetary and coaxial clutches, and series steer planetaries. A two- or three-mode HMT is created by having HST 51 in parallel with two or three alternate mechanical power paths defined by either clutch 22, 23 or 24. Clutch 23 has a speed reversing gear 14 to produce reverse output speed. Four-element planetary 49 sums the parallel power flows and delivers a continuously variable speed and torque to the output gear set 95/96. The differential steer is created by planetaries 50 and 46 in series with HMT output 95/96 and HST 52. The planetaries have a speed reversing gear 93 on one power path connection. HST 52 controls the differential speed between output shaft 16-1 and 16-2 by adding speed to one and subtracting speed from the other through interaction of the series planetary arrangement.

Figure 9:
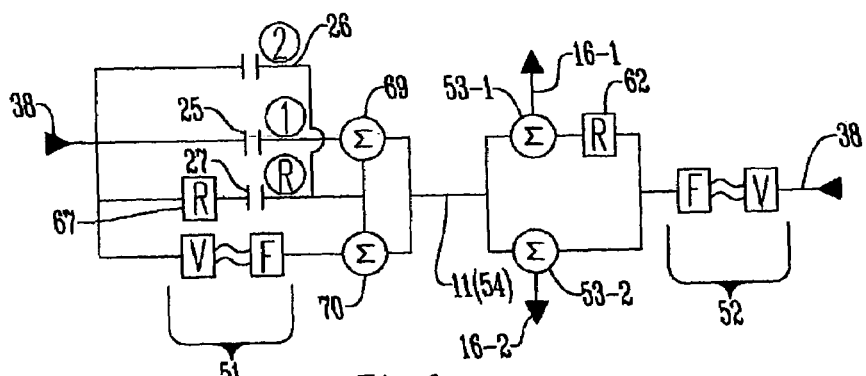
FIG. 9 is a block diagram of the transmission of FIG. 8.

FIG. 9 is the block diagram of an HMT having parallel axis HMT planetaries and parallel power flow planetaries which are used for differential steer. The 2- or 3-mode HMT is created by having HST 51 in parallel with two or three alternate mechanical power paths defined by either clutch 25, 26 or 27. Clutch 27 has a speed reversing gear 67 to produce reverse output speed. Four-element planetary 69/70, which is created by continuously connecting two elements from each three element planetary, sums the parallel power flows and delivers a continuously variable speed and torque to the two output shafts 16. The differential steer is created by planetaries 53-1 and 53-2 in parallel with HMT output 11/54 and HST 52. The planetaries have a speed reversing gear 62 on one power path connection. HST 52 controls the differential speed between output shaft 16-1 and 16-2 by adding speed to one and subtracting speed from the other of the parallel planetaries.

Figure 8:
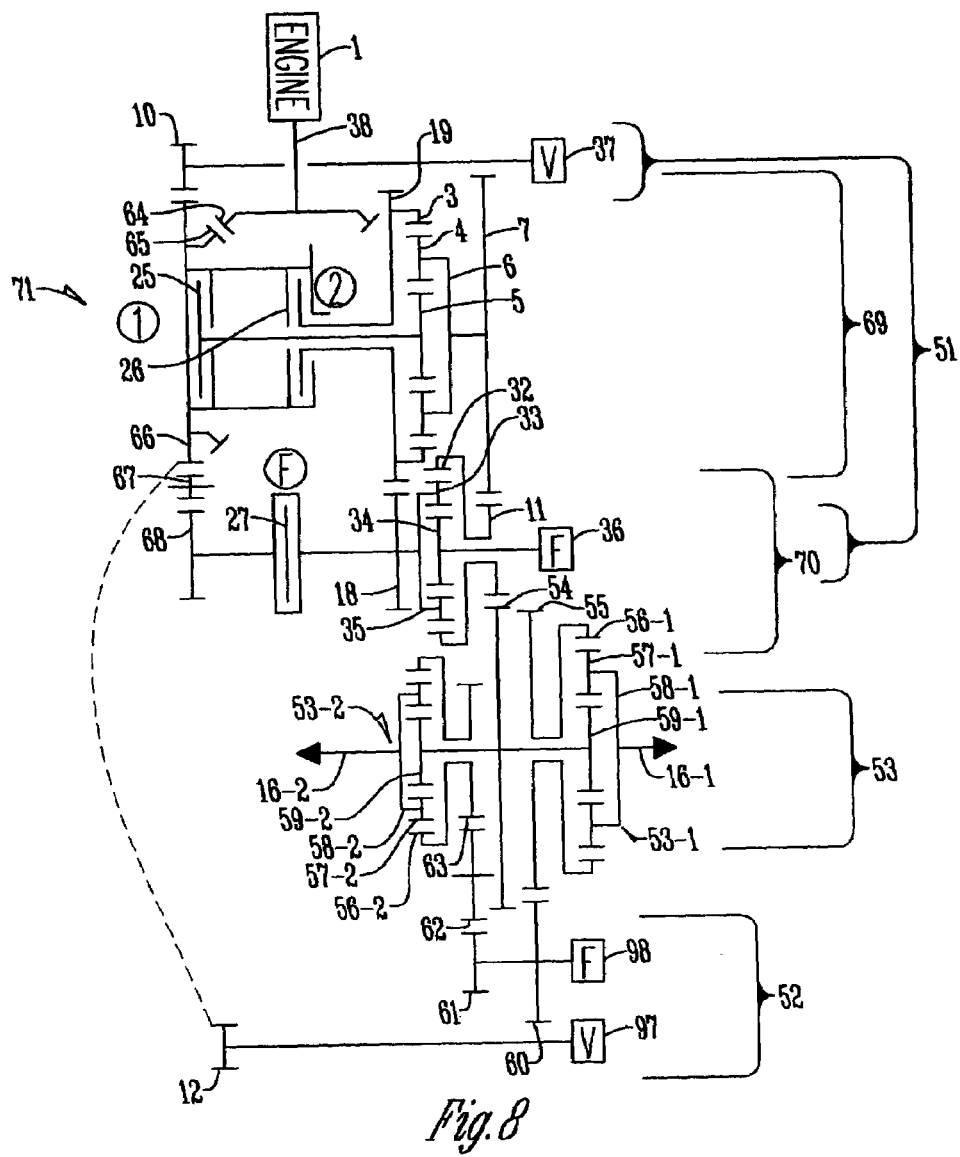
FIG. 8 is a schematic drawing of HMT circuitry and components having parallel axis planataries and parallel steer planataries.

Shown schematically in FIG. 8, primary component groups are hydrostatic transmission 51, 3-element planetary summer 69, which consists of ring 3, sun 5 and carrier 6, 3-element planetary 70, which consists of ring 32, sun 34 and carrier 35, and three clutches 25, 26 and 27. Planetaries 69 and 70 are interconnected at gear sets 19/18 and 7/11 which forms four independent planetary elements on two separate axes of rotation. Differential steer planeteries 53-1 and 53-2, and steer hydrostatic 52 are active when steering. In the start-up mode, which is hydromechanical, clutch 25 is engaged for mode 1 forward that enables engine power to flow to sun 5. Engine 1 is connected through shaft 38 to gear set 64/65 and 66/10 to the hydrostatic transmission 51, however as both V-unit 37 and F-unit 36 are at maximum displacement and the same speed, no power is being transmitted. As the operator and programmed logic commands, a controller strokes V-unit 37 displacement to a smaller value. Note that power is now being delivered to planetaries 69/70 through sun 34, and through gear set 64/65 to sun 5, creating parallel power paths. Power is transmitted from both paths to carrier 6, to gear set 7/11/54 and to outputs 16. Because sun 34 is speed controlled by HST 51, a variable speed is controlled at outputs 16. As V-unit 37 is stroked toward zero displacement, F-unit 36 slows, which speeds up carrier 6 and outputs 16. As V-unit 37 is stroked though zero and then to maximum in the negative direction, carrier 6 continues to speed up and the output shafts 16-1 and 16-2 reach the maximum forward speed for mode 1. The stroke control logic for the V-unit that resides in a controller may be of any type and may be like that described in U.S. Pat. No. 5,560,203.

For reverse direction of travel, clutch 27 is engaged. This is done at zero output speed with carrier 35 and gear 18 at the same nominal speed, which is negative with respect to input rotation. At this condition, V-unit 37 is fully stroked in a positive direction. Gear set 64/65/66/67/68 is driven by the input shaft 38, enabling power flow in planetary 70 through carrier 35, and in sun 34 through HST 51, creating a parallel power path. As clutch 25 is disengaged, sun 5 turns free preventing power flow in planetary 69. The controller strokes V-unit 37 from full positive to full negative displacement, first reducing the speed of F-unit 36 to zero and then increasing it to full negative speed, which causes ring 32 and outputs 16 to increase in speed with reverse rotation. With a variable speed from F-unit 36 to regulate sun 34 speed, and a fixed speed from input 38 to determine carrier 35 speed, output speed is controlled between zero and its maximum value in reverse. The stroke control logic for V-unit 37 is consistent with mode 1 forward.

If a second forward mode is required, a mode change is initiated and clutch 25 and 26 are shifted. At the fully negative stroked position of V-unit 37, ring 3 and sun 5 of planetary 69 are at the same nominal speed. When clutch 26 is engaged, power from input shaft 38 is delivered to carrier 35, and power is delivered to sun 34 through HST 51. The controller strokes V-unit 37 from full negative to full positive displacement and output speed delivered through ring 32 and gear set 11/54 to shafts 16-1 and 16-2 and output speed reaches maximum for mode 2 forward. The stroke control logic for V-unit 37 is consistent with mode 1 forward and reverse mode.

Note that continuous power is delivered from the engine to the wheels, with continuous ratio change, from full reverse to full forward speed even though the transmission changes modes at zero speed and at about half forward speed. The gear ratios may be different to accommodate different torque/speed ratio spreads for the HMT.

Planetary 69/70 (FIG. 8) has four independent power elements but on two axes of rotation. This is accomplished by having two normal three-element planetaries and continuously engaging two elements of each planetary with gears. The ratio selected between the planetary axes allows the F-unit 36 to be direct connected to sun 34, which may be approximately 3 times input speed. As the operating speed of clutch 27 is about ⅓ times F-unit speed, this combination also allows normal speed and torque on clutch 27.

The differential steer is done with HST 52 and simple planetaries 53-1 and 53-2. Planetaries 53-1 and 53-2 are similar and have a negative ratio between the rings 56 and suns 59. The rings 56-1 and 56-2 are connected to F-unit 98 with the same ratio except one is positive and the other is negative. When speed is applied to sun 59-1 and 59-2 by HMT output 11/54, equal torque is also applied to carriers 58-1 and 58-2 as the planetaries have the same ratio. The speed of output shaft 16-1 and 16-2 is determined by the rotation of rings 56-1 and 56-2. For straight-ahead motion, F-unit 98 is at zero speed which locks gear set 55/60 and 61/62/63 and also locks rings 56-1 and 56-2. With the rings locked and suns interconnected, carriers 58-1 and 58-2 are constrained to operate in the same direction and at the same speed, producing straight-line motion for the vehicle. When V-unit 97 is stroked in one direction, F-unit 98 turns gear set 55/60 and 61/62/63, and rotates ring 56-1 and 56-2 at equal speed but in opposite directions. This then has the effect of adding speed to one of shafts 16-1 or 16-2 and subtracting an equal amount from the other, producing steering of the vehicle. Reversing the direction of HST 52 will reverse the direction of the differential speed at the output shafts. Note that the effect of this planetary arrangement is for the HMT input to control average output speed and the HST input to control differential output speed.

It is therefore seen that this invention will achieve at least all of its stated objectives.

What is claimed is:

1. A hydromechanical transmission with a single, four-element planetary system comprising a sun gear, a first and second ring gear and a carrier, and a maximum of three planet gear centerlines; wherein a first planet gear meshes with the first ring gear and a second planet gear meshes with the second ring gear; and wherein the first and second planet gears are along the same centerline.

2. The hydromechanical transmission of claim 1 wherein clutches are located on a single centerline and are co-axially positioned with the four-element planetary.

3. The hydromechanical transmission of claim 1 wherein the carrier is the output member of the four-element planetary.

4. A differential speed transmission having first and second inputs, a hydrostatic transmission connected to the second input, a first and second planetary each having first, second and third elements, the first planetary connected with the first input at the first element of the first planetary, and the second planetary is connected to the second input at the first element of the second planetary, the second element of the first planetary being connected to the second element of the second planetary, and the third element of the first planetary being connected to the third element of the second planetary with a reversing drive, with the output speed being controlled by the first input, and the differential output speed being controlled by the a hydrostatic transmission through the second input.

5. The transmission of claim 4 wherein the first element of the first planetary is a carrier, the first element of the second planetary is a carrier, the second and third elements of the first planetary are first and second ring gears, the second and third elements of the second planetary are first and second ring gears, and the first planetary having a first planet connected to the first ring gear of the first planetary and a second planet connected to the second ring gear of the first planetary, and wherein the second planetary has a first planet connected to the first ring gear of the second planetary and a second planet connected to the second ring gear of the planetary; wherein the first planet of the first planetary is drivingly connected to the first planet of the second planetary and the second planet of the first planetary is drivingly connected to the second planet of the second planetary.

6. The transmission of claim 4 wherein the first input is from a hydromechanical transmission output.

* * * * *